United States Patent
Shintaku et al.

[11] Patent Number: 5,905,823
[45] Date of Patent: May 18, 1999

[54] POLARIZATION INDEPENDENT OPTICAL NONRECIPROCAL CIRCUIT BASED ON EVEN MODE TO ODD MODE CONVERSION

[75] Inventors: Toshihiro Shintaku; Yujiro Katoh, both of Ibaragiken; Yoshiaki Tachikawa, Tokyo; Naoto Sugimoto, Ibarakiken; Haruki Kozawaguchi, Tokyo, all of Japan

[73] Assignee: Nippon Telegraph and Telephone Corporation, Japan

[21] Appl. No.: 08/810,321

[22] Filed: Feb. 28, 1997

[30] Foreign Application Priority Data

Feb. 28, 1996 [JP] Japan ........................................ 8-41702
Jun. 18, 1996 [JP] Japan ...................................... 8-157228

[51] Int. Cl.$^6$ ............................................... G02B 6/27
[52] U.S. Cl. ........................ 385/11; 359/494; 359/497; 385/24
[58] Field of Search ........................... 385/11, 15, 24, 385/31; 359/483–485, 487, 488, 494–500

[56] References Cited

U.S. PATENT DOCUMENTS

| | | | |
|---|---|---|---|
| 4,239,329 | 12/1980 | Matsumoto | 385/11 |
| 4,978,189 | 12/1990 | Blonder et al. | 385/31 X |
| 5,033,830 | 7/1991 | Jameson | 359/494 X |
| 5,078,512 | 1/1992 | Ando | 385/11 |
| 5,204,771 | 4/1993 | Koga | 359/495 X |
| 5,471,340 | 11/1995 | Cheng et al. | 385/11 X |

FOREIGN PATENT DOCUMENTS

| | | |
|---|---|---|
| 8-050261 | 2/1996 | Japan . |
| 8-50261 | 2/1996 | Japan . |
| WO93/20475 | 10/1993 | WIPO . |

OTHER PUBLICATIONS

"Integrated optical isolator and circulator using nonreciprocal phase shifters: a proposal," Okamura et al., *Applied Optics*, vol. 23, No. 11, p. 1886, Jun. 1, 1984.

"Polarization–Independent Silica–on–Silicon Mach–Zehnder Interferometers," Yaffe, et al., *Journal of Lightwave Technology*, Jan. 12, 1994, No. 1, p. 64.

"Radiation Modes of a Five–Layer Symmetric Slab Waveguide," Theodoropoulos, et al., *International Journal of Infrared and Millimeter Waves*, Oct. 16, 1995, No. 10, p. 1811.

*Primary Examiner*—John D. Lee
*Attorney, Agent, or Firm*—Banner & Witcoff, Ltd.

[57] ABSTRACT

An inexpensive polarization independent optical nonreciprocal circuit which does not require a use of expensive birefringent crystals, optical branching circuits, and a phase adjustment. The optical nonreciprocal circuit is formed by at least one lens through which a light propagating between two waveguides passes; and a polarization rotation circuit for sequentially applying a nonreciprocal rotation and a reciprocal rotation to a first half of the light propagating between two waveguides, and sequentially applying a reciprocal rotation and a nonreciprocal rotation to a second half of the light propagating between two waveguides, so that the first half and the second half of a light propagating forward are set to have an identical polarization to form an even guided mode and coupled, while the first half and the second half for a light propagating backward are set to have opposite polarizations to form an odd non-guided mode and dissipated.

11 Claims, 18 Drawing Sheets

FIG.4A  FORWARD LIGHT POLARIZED ALONG X-AXIS
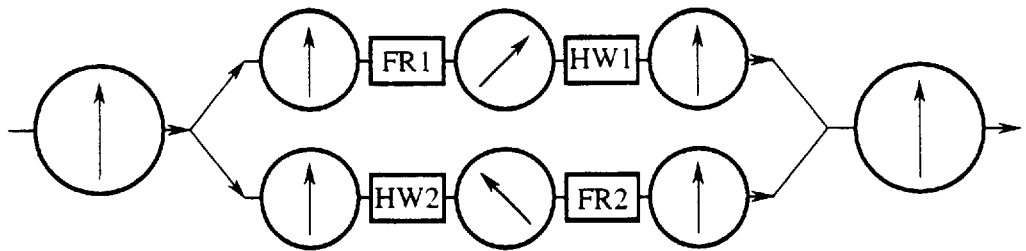
FIG.4B  FORWARD LIGHT POLARIZED ALONG Y-AXIS
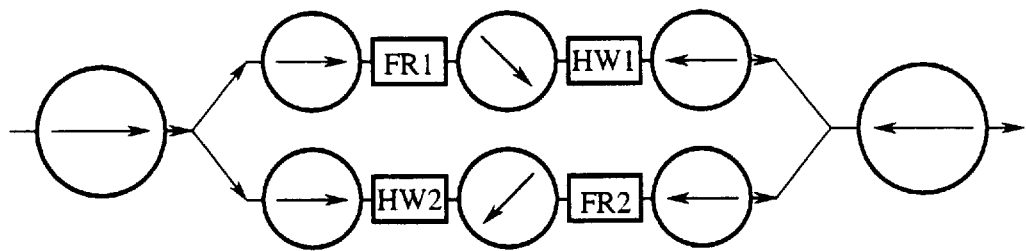
FIG.4C  BACKWARD LIGHT POLARIZED ALONG X-AXIS
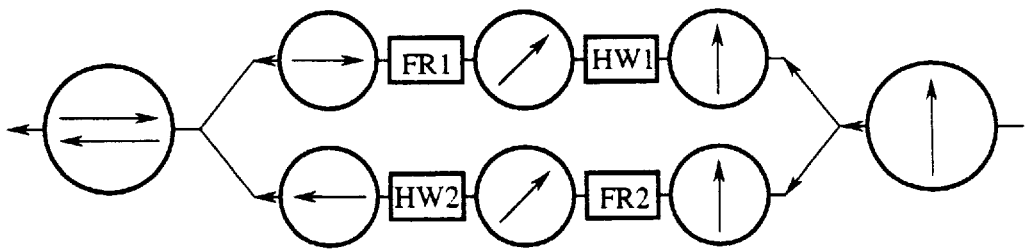
FIG.4D  BACKWARD LIGHT POLARIZED ALONG Y-AXIS
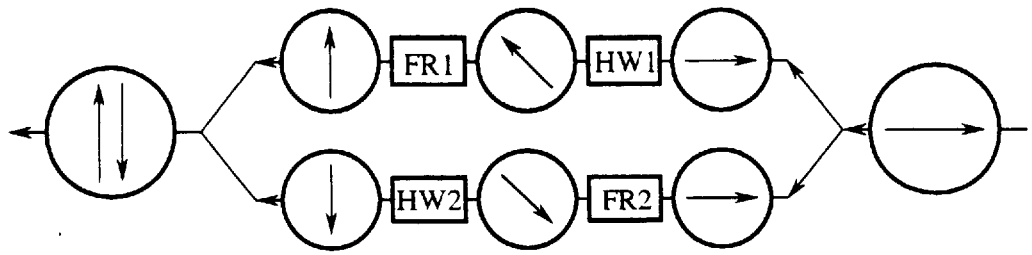

5,905,823

POLARIZATION INDEPENDENT OPTICAL NONRECIPROCAL CIRCUIT BASED ON EVEN MODE TO ODD MODE CONVERSION

BACKGROUND OF THE INVENTION

1. Field of the Invention

The present invention relates to an optical nonreciprocal circuit (such as an optical isolator and an optical circulator) used in optical communications, optical measurements, etc., and more particularly, to a polarization independent optical nonreciprocal circuit.

2. Description of the Background Art

FIG. 1 shows one example of a conventional polarization independent optical nonreciprocal circuit in a form of an optical circulator, which comprises polarization beam splitters 1 and 2, Faraday rotators 3 and 4 such as those made of YIG (Yttrium Iron Garnet), magnets 5 and 6 for applying magentic fields onto the Faraday rotators 3 and 4, respectively, half wave plates 7 and 8, and total reflection mirrors 9 and 10.

By coupling the Faraday rotators 3 and 4 for rotating the polarization by 45 degrees and half wave plates 7 and 8 for compensating the polarizations by 45 degrees, this circuit of FIG. 1 has a configuration in which the polarization of a light propagating toward the right direction on a plane of the drawing will be rotated by 0 degree while the polarization of a light propagating toward the left direction on a plane of the drawing will be rotated by 90 degrees.

A light incoming from a port-1 is split by the polarization beam splitter 1 and an s-polarization (vertical polarization) component is reflected upward while a p-polarization (horizontal polarization) component is transmitted downward. Then, the split beams pass through the mirrors 9 and 10, the Faraday rotators 3 and 4, and the half wave plates 7 and 8, respectively. Here, the polarization state remains unchanged throughout because it is a light propagating toward the right direction. Then, the split beams are combined by the polarization beam splitter 2 and outputted from a port-2.

On the other hand, a light enetered from the port-2 is polarized and split by the polarization beam splitter 2, and the split beams pass through the half wave plates 7 and 8 and the Faraday rotators 3 and 4. Here, the polarization state is changed by converting the s-polarization into the p-polarization and the P polarization into the S polarization because it is a light propagating toward the left direction. Then, the split beams are combined by the polarization beam splitter 1 and outputted from a port-3.

In this manner, the light incoming from the port-2 does not return to the port-1, so that this circuit of FIG. 1 functions as an optical circulator.

However, in this conventional optical nonreciprocal circuit of FIG. 1, it is necessary to use the polarization beam splitters which are very expensive and it is also necessary to adjust the optical axis and the polarization angle at high precision, so that this conventional optical reciprocal circuit of FIG. 1 has been associated with a poor reliability and a very high cost. In addition, this conventional optical nonreciprocal circuit of FIG. 1 is not suitable for an integrated implementation because the polarization beam splitters are not suitable for an integrated implementation.

FIG. 2 shows another example of a conventional polarization independent optical nonreciprocal circuit in a form of an optical isolator, which comprises optical fibers 11 and 12, a lens 13, birefringent crystals 14 and 15, a magneto-optic material 16, and a compensator 17.

As shown in a part (b) of FIG. 2, a light incoming from the optical fiber 11 is split into an ordinary ray and an extraordinary ray by the birefringent crystal 14. Then, the polarization of each ray is rotated by $\pi/2$ as each ray passes through the magneto-optic material 16 and the compensator 17. These rays are combined again by the birefringent crystal 15, and coupled onto the optical fiber 12.

Also, as shown in a part (c) of FIG. 2, a light incoming from the optical fiber 12, that is, a light propagating backwards, is split into the ordinary ray and the extraordinary ray by the birefringent crystal 15 and these rays pass through the compensator 17 and the magneto-optic material 16, but the polarization direction is not changed in this case, so that these rays are further split by the birefringent crystal 14 and not coupled onto the optical fiber 11.

In this conventional optical nonreciprocal circuit of FIG. 2, the polarization independent optical isolator is realized, but it is necessary to use the birefringent crystals which are very expensive, so that this conventional optical nonreciprocal circuit of FIG. 2 has been associated with a very high cost.

In this regard, there is a proposition of an optical circulator which does not require any polarization beam splitter as disclosed in Japanese Patent Application No. 6-184359 (1994), but this optical circulator has a configuration in which angles of reciprocal rotators and nonreciprocal rotators are limited to specific values so that there is no degree of freedom regarding its configuration. More specifically, in this optical circulator, the Faraday rotation angles $\theta_{f1}$ and $\theta_{f2}$ of two nonreciprocal rotators are limited to $\theta_{f1}=\theta_{f2}=\pi/4$ while the slow axis angle with respect to x-axis $\theta_{s1}$ and $\theta_{s2}$ of two half wave plates are limited to $\theta_{s1}=3\pi/8$ and $\theta_{s2}=5\pi/8$.

In addition, this optical circulator uses directional couplers, but the directional coupler in general has a polarization dependency, so that the polarization dependent loss (PDL) cannot be eliminated in this optical circulator in which the polarization does not change in both TE and TM modes.

SUMMARY OF THE INVENTION

It is therefore an object of the present invention to provide a polarization independent optical nonreciprocal circuit which does not require a use of expensive polarization beam splitters so that it is inexpensive and suitable for an integrated implementation.

It is another object of the present invention to provide a polarization independent optical nonreciprocal circuit which does not require a use of expensive birefringent crystals, optical branching circuits, and a phase adjustment, so that it is inexpensive.

It is another object of the present invention to provide a polarization independent optical nonreciprocal circuit which does not require a use of polarization beam splitters, and which is capable of providing a large degree of freedom in its configuration and of eliminating the polarization dependent loss due to the branching circuits such as directional couplers.

According to one aspect of the present invention there is provided an optical nonreciprocal circuit for coupling lights between two waveguides, comprising: at least one lens through which a light propagating between said two waveguides passes; and a polarization rotation circuit for sequentially applying a nonreciprocal rotation and a reciprocal rotation to a first half of the light propagating between said two waveguides, and sequentially applying a reciprocal rotation and a nonreciprocal rotation to a second half of the light propagating between said two waveguides, so that the first half and the second half of a light propagating forward are set to have an identical polarization to form an even guided mode and coupled, while the first half and the second half for a light propagating backward are set to have opposite polarizations to form an odd non-guided mode and dissipated.

According to another aspect of the present invention there is provided an optical nonreciprocal circuit for splitting/combining lights, comprising: an optical nonreciprocal circuit for splitting/combining lights, comprising: a first optical path and a second optical path through which first and second split lights propagate; a first polarization rotation circuit provided on the first optical path, including a first nonreciprocal rotator having a Faraday rotation angle $\theta_{f1}$, and a first reciprocal rotator formed by a half wave plate having a slow axis angle $\theta_{s1}$ with respect to an x-axis in x-y coordinates set up within a plane perpendicular to a propagation direction of the light, which are provided in relation to the first split light; and a second polarization rotation circuit provided on the second optical path, including a second reciprocal rotator formed by a half wave plate having a slow axis angle $\theta_{s2}$ with respect to the x-axis, and a second nonreciprocal rotator having a Faraday rotation angle $\theta_{f2}$, which are provided in relation to the second split light; wherein $\theta_{f1}$, $\theta_{f2}$, $\theta_{s1}$, and $\theta_{s2}$ satisfy: $\theta_{s1}-\theta_{s2}=\pm\pi/4$, and $\theta_{f1}+\theta_{f2}=\pm\pi/2+2n\pi$, where n is an integer, so that the first split light and the second split light for a light propagating forward are set to have an identical polarization and combined to form an even mode, while the first split light and the second split light for a light propagating backward are set to have opposite polarizations and combined to form an odd mode.

According to another aspect of the present invention there is provided an optical nonreciprocal circuit for splitting/combining lights, comprising: an optical nonreciprocal circuit for splitting/combining lights, comprising: a first optical path and a second optical path through which first and second split lights propagate; a first directional coupler, provide on one end side of the first and second optical paths, for splitting a light propagating forward into the first and second split lights and outputting the first and second split lights to the first and second optical paths, and combining a light propagating backward entered from the first and second optical paths; a second directional coupler, provided on another end side of the first and second optical paths, for splitting a light propagating backward into the first and second split lights and outputting the first and second split lights to the first and second optical paths, and combining a light propagating forward entered from the first and second optical paths; a first polarization rotation circuit provided on the first optical path, including a first nonreciprocal rotator having a Faraday rotation angle $\theta_{f1}$, and a first reciprocal rotator formed by a half wave plate having a slow axis angle $\theta_{s1}$ with respect to an x-axis in x-y coordinates set up within a plane perpendicular to a propagation direction of the light, which are provided in relation to the first split light; and a second polarization rotation circuit provided on the second optical path, including a second reciprocal rotator formed by a half wave plate having a slow axis angle $\theta_{s2}$ with respect to the x-axis, and a second nonreciprocal rotator having a Faraday rotation angle $\theta_{f2}$, which are provided in relation to the second split light; wherein $\theta_{f1}$, $\theta_{f2}$, $\theta_{s1}$, and $\theta_{s2}$ satisfy: $\theta_{s1}-\theta_{s2}=\pm\pi/4$, and $\theta_{f1}+\theta_{f2}=\pm\pi/2+2n\pi$, where n is an integer, but not satisfying $\theta_{s1}=3\pi/8$, $\theta_{s2}=5\pi/8$, and $\theta_{f1}=\theta_{f2}=\pi/4$ simultaneously, so that the first split light and the second split light for a light propagating forward are set to interfere at an identical polarization and combined, while the first split light and the second split light for a light propagating backward are set to interfere at opposite polarizations and combined.

Other features and advantages of the present invention will become apparent from the following description taken in conjunction with the accompanying drawings.

BRIEF DESCRIPTION OF THE DRAWINGS

FIGS. 4A to 4D are diagrams for explaining the operation principle of the optical nonreciprocal circuit of FIG. 3.

DETAILED DESCRIPTION OF THE PREFERRED EMBODIMENTS

Figure 1:
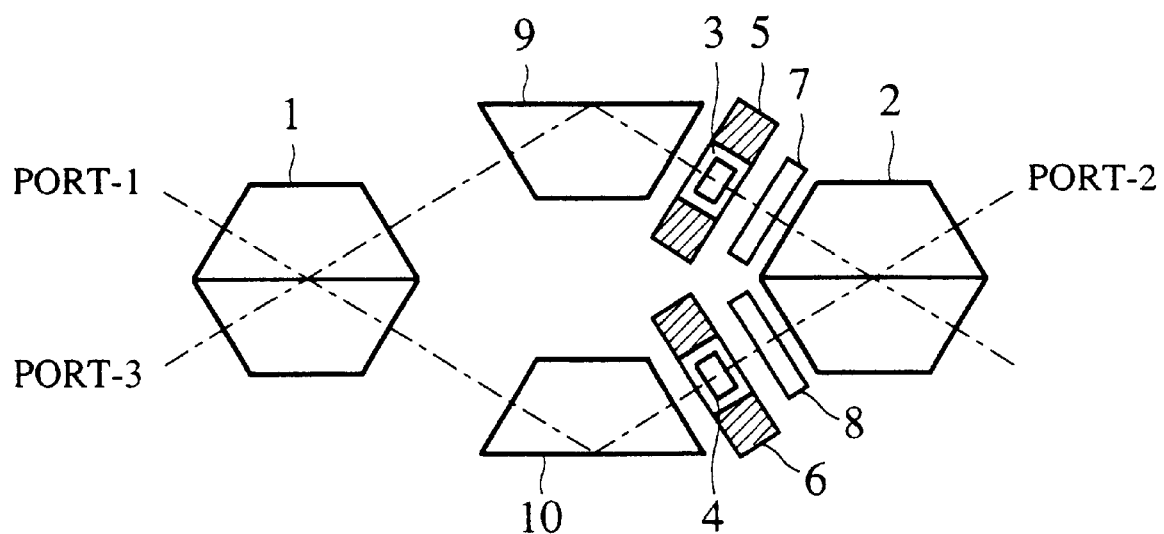
FIG. 1 is a schematic block diagram of one example of a conventional optical nonreciprocal circuit in a form of an optical circulator.
Figure 2:
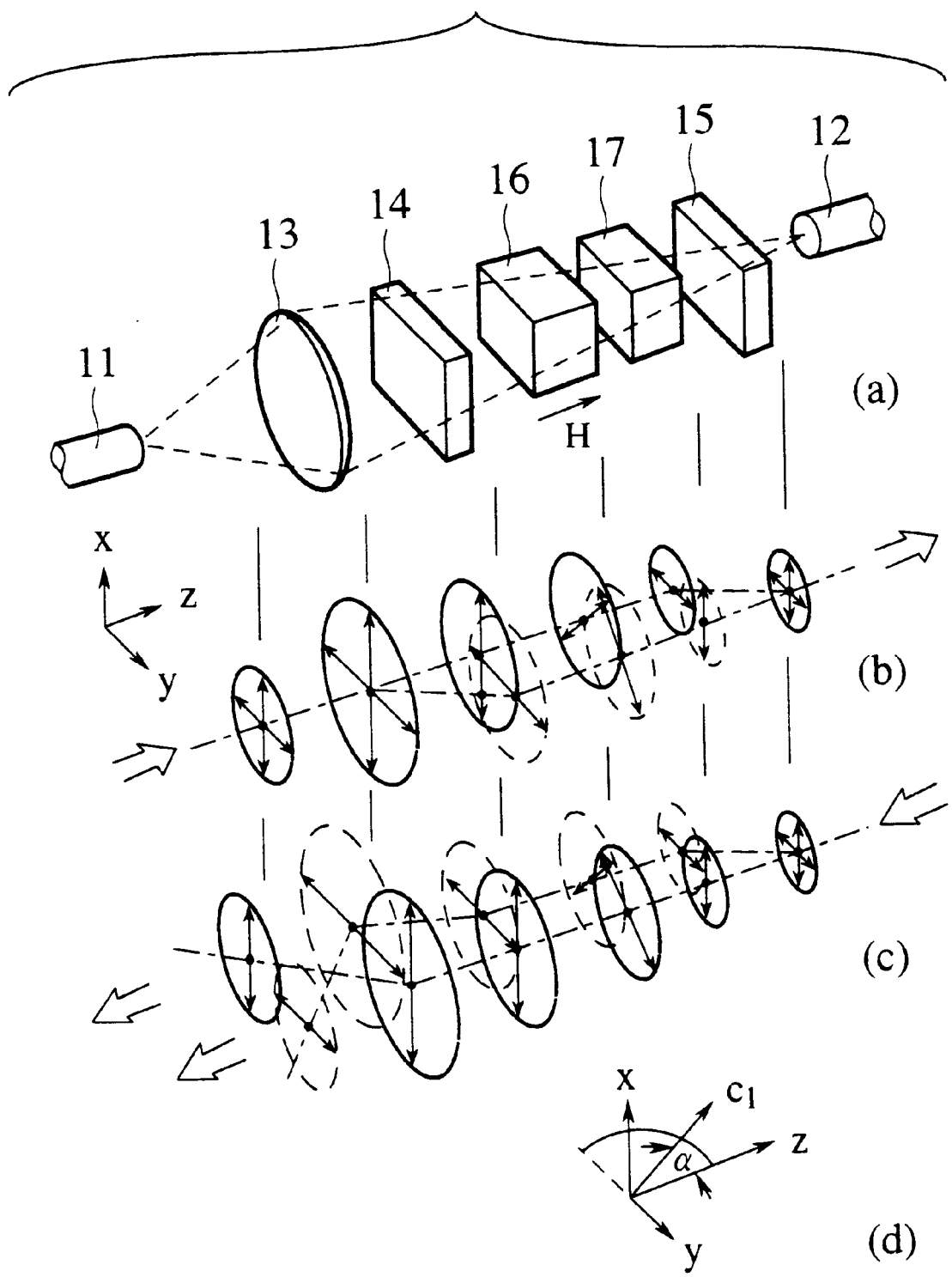
FIG. 2 is a schematic block diagram of another example of a conventional optical nonreciprocal circuit in a form of an optical isolator.
Figure 3:
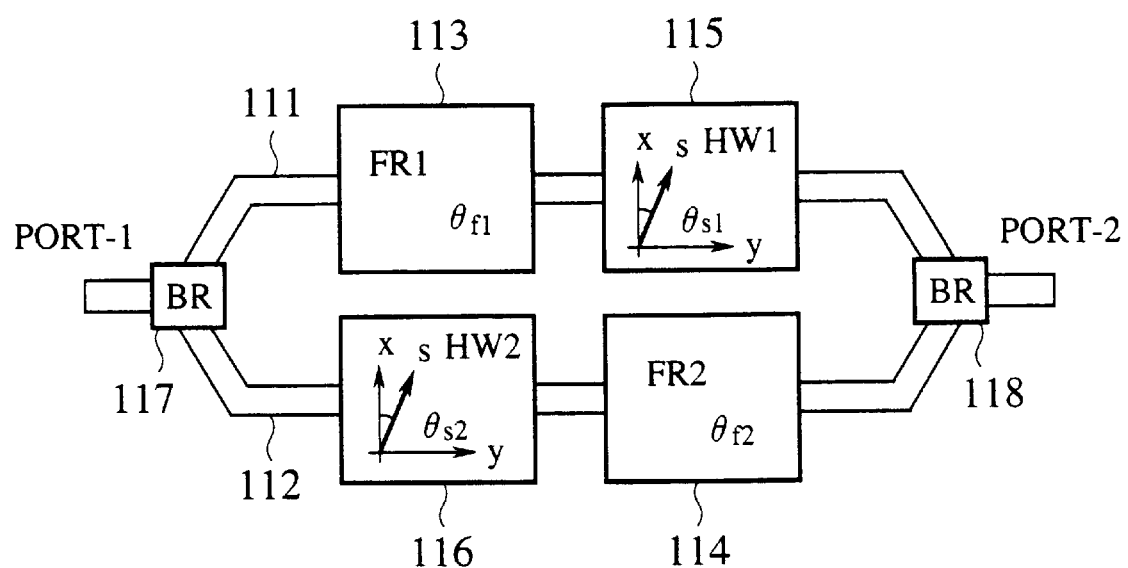
FIG. 3 is a block diagram of the first basic configuration of an optical nonreciprocal circuit according to the present invention.
Figure 5:
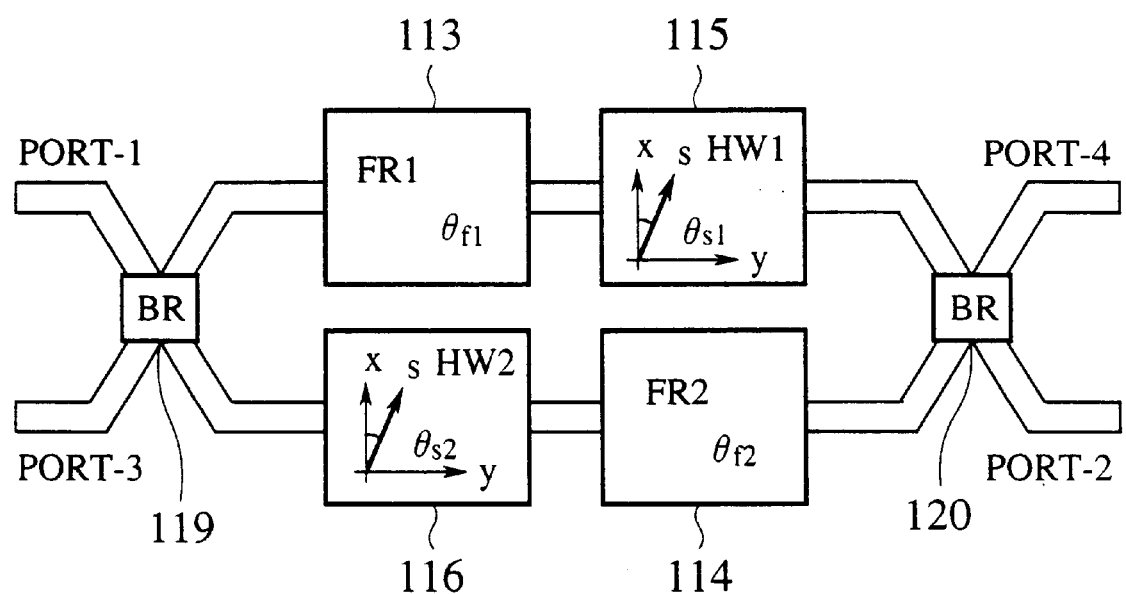
FIG. 5 is a block diagram of the second basic configuration of an optical nonreciprocal circuit according to the present invention.

Referring now to FIG. 3 to FIG. 5, the basic principles of the optical nonreciprocal circuit according to the present invention will be described in detail.

FIG. 3 shows the first basic configuration of the optical non reciprocal circuit according to the present invention, which comprises optical paths 111 and 112, Faraday rotators (FR1, FR2) 113 and 114 functioning as nonreciprocal rotators on the optical paths 111 and 112 respectively, half wave plates (HW1, HW2) 115 and 116 functioning as reciprocal rotators on the optical paths 111 and 112 respectively, and branching circuits (BR) 117 and 118 for splitting or combining optical beams propagaing through the optical paths 111 and 112 respectively.

Here, a direction of a light propagaing toward the right direction will be taken as a z-axis, an axis perpendicular to a plane of the optical paths 111 and 112 which is perpendicular to the z-axis will be taken as an x-axis, an axis horizontal to a plane of the optical paths 111 and 112 which is perpendicular to the z-axis will be taken as a y-axis, and a clockwise rotation will be taken as a positive rotation. With respect to this coordinates setting, the Faraday rotation angles of the Faraday rotators 113 and 114 will be denoted as $\theta_{f1}$ and $\theta_{f2}$, respectively, while the slow axis angle with respect to the x-axis of the half wave plates 115 and 116 will be denoted as $\theta_{s1}$ and $\theta_{s2}$, respectively.

As an example, suppose that the Faraday rotation angles of the Faraday rotators 113 and 114 are set to be $\theta_{f1}=\theta_{f2}=\pi/4$, and the slow axis angle with respect to the x-axis of the half wave plates 115 and 116 are set to be $\theta_{s1}=\pi/8$ and $\theta_{s2}=-\pi/8$.

Now, the operation principle of the optical nonreciprocal circuit of FIG. 3 in this exemplary case will be described with reference to the change of the polarization states as illustrated in FIGS. 4A to 4D.

(a) Forward light polarized along the x-axis (FIG. 4A): A light polarized along the x-axis which is incoming from the left is split into two beams. A beam propagated upwards is rotated by $\pi/4$ at FR1 and $-\pi/4$ at HW1 so that it is returned to its original state. On the other hand, a beam propagated downwards is rotated by $-\pi/4$ at HW2 and $\pi/4$ at FR2 so that it is returned to its original state. Two beams in the identical phase are then combined to form an even mode (guided mode) and outputted at the output side branching circuit.

(b) Forward light polarized along the y-axis (FIG. 4B): A light polarized along the y-axis which is incoming from the left is split into two beams. A beam propagated upwards is rotated by $\pi/4$ at FR1 and $3\pi/4$ at HW1 so that it is inverted from its original state. On the other hand, a beam propagated downwards is rotated by $3\pi/4$ at HW2 and $\pi/4$ at FR2 so that it is inverted from its original state. Two beams in the identical inverted phase are then combined to form an even mode (guided mode) and outputted at the output side branching circuit.

(c) Backward light polarized along the x-axis (FIG. 4C): A light polarized along the x-axis which is incoming from the right is split into two beams. A beam propagated upwards is rotated by $\pi/4$ at HW1 and $\pi/4$ at FR1 so that it is rotated by $\pi/2$ from its original state. On the other hand, a beam propagated downwards is rotated by $\pi/4$ at FR2 and $5\pi/4$ at HW2 so that it is rotated by $3\pi/2$ from its original state. Two beams in the opposite phases are then combined to form an odd mode (non-guided mode) and dissipated at the output side branching circuit.

(d) Backward light polarized along the y-axis (FIG. 4D): A light polarized along the y-axis which is incoming from the right is split into two beams. A beam propagated upwards is rotated by $5\pi/4$ at HW1 and $\pi/4$ at FR1 so that it is rotated by $3\pi/2$ from its original state. On the other hand, a beam propagated downwards is rotated by $\pi/4$ at FR2 and $\pi/4$ at HW2 so that it is rotated by $\pi/2$ from its original state. Two beams in the opposite phases are then combined to form an odd mode (non-guided mode) and dissipated at the output side branching circuit.

In this manner, the light propagating in the right direction is outputted with its original power maintained while the light propagating in the left direction has its power dissipated, so that the polarization independent optical isolator can be realized. In addition, by choosing $\theta_{s1}=3\pi/8$ and $\theta_{s2}=\pi/8$ for the half wave plates 115 and 116, the polarization of the outgoing light can be rotated by $\pi/2$ with respect to the incoming light, so that it is possible to eliminate the polarization dependency of the branching circuit.

Next, the general conditions on $\theta_{f1}$, $\theta_{f2}$, $\theta_{s1}$ and $\theta_{s2}$ will be derived using the propagation matrix. By denoting an amplitude of an incoming light polarized along the x-axis as $A_x$, an amplitude of an incoming light polarized along the y-axis as $A_y$, an amplitude of an outgoing light polarized along the x-axis as $B_x$, and an amplitude of an outgoing light polarized along the y-axis as $B_y$, the propagation matrix T is defined by the following equation (1).

$$\begin{pmatrix} B_x \\ B_y \end{pmatrix} = T \begin{pmatrix} A_x \\ A_y \end{pmatrix} \quad (1)$$

In the configuration of FIG. 3, the propagation matrix $T_F$ for the forward light incoming from the port-1 and outgoing to the port-2 is expressed by the following equation (2).

$$T_F = \frac{-j}{2}\left\{\begin{pmatrix} \cos(2\theta_{s1}-\theta_{f1}) & \sin(2\theta_{s1}-\theta_{f1}) \\ \sin(2\theta_{s1}-\theta_{f1}) & -\cos(2\theta_{s1}-\theta_{f1}) \end{pmatrix} + \begin{pmatrix} \cos(2\theta_{s2}+\theta_{f2}) & \sin(2\theta_{s2}+\theta_{f2}) \\ \sin(2\theta_{s2}+\theta_{f2}) & -\cos(2\theta_{s2}+\theta_{f2}) \end{pmatrix}\right\} \quad (2)$$

Also, the propagation matrix $T_B$ for the backward light incoming from the port-2 and outgoing to the port-1 is expressed by the following equation (3).

$$T_B = \frac{-j}{2}\left\{\begin{pmatrix} \cos(2\theta_{s1}+\theta_{f1}) & \sin(2\theta_{s1}+\theta_{f1}) \\ \sin(2\theta_{s1}+\theta_{f1}) & -\cos(2\theta_{s1}+\theta_{f1}) \end{pmatrix} + \begin{pmatrix} \cos(2\theta_{s2}-\theta_{f2}) & \sin(2\theta_{s2}-\theta_{f2}) \\ \sin(2\theta_{s2}-\theta_{f2}) & -\cos(2\theta_{s2}-\theta_{f2}) \end{pmatrix}\right\} \quad (3)$$

The necessary conditions for outputting the forward light without dissipating its power while making the power of the backward light equal to zero are that $T_F$ becomes a unitary matrix and $T_B$ becomes a zero matrix. By applying these conditions to the above equations (2) and (3), the general conditions on $\theta_{f1}$, $\theta_{f2}$, $\theta_{s1}$ and $\theta_{s2}$ can be obtained as the following equations (4) and (5).

$$\theta_{s1} - \theta_{s2} = \pm \pi/4 \quad (4)$$

$$\theta_{f1} + \theta_{f2} = \pm \pi/2 + 2n\pi \text{ (where n is an integer)} \quad (5)$$

In addition, the polarization dependency of the branching circuit can be improved by converting the polarization along the x-axis into the polarization along the y-axis and the polarization along the y-axis into the polarization along the x-axis. The necessary condition for this to be the case is that $T_F$ has all diagonal elements equal to zero. By applying this to the above equation (2), the additional condition on $\theta_{f1}$, $\theta_{f2}$, $\theta_{s1}$ and $\theta_{s2}$ can be obtained as the following equation (6).

$$2\theta_{s1} - \theta_{f1} - 2\theta_{s2} - \theta_{f2} = \pi + 2m\pi \quad (6)$$

(where m is an integer)

For instance, when $\theta_{f1} = \theta_{f2} = \pi/4$, either the setting of the following equations (7) and (8):

$$\theta_{s1} = 3\pi/8 + k\pi/2 \text{ (where k is an integer)} \quad (7)$$

$$\theta_{s2} = \pi/8 + k\pi/2 \text{ (where k is an integer)} \quad (8)$$

or the setting of the following equations (9) and (10):

$$\theta_{s1} \pi/8 + K\pi/2 \text{ (where k is an integer)} \quad (9)$$

$$\theta_{s2} = 3\pi/8 + k\pi/2 \text{ (where k is an integer)} \quad (10)$$

can be used.

FIG. 5 shows the second basic configuration of the optical non reciprocal circuit according to the present invention, in which the four terminal branching circuits 119 and 120 replaces the three terminal branching circuits 117 and 118 in the configuration of FIG. 3, so as to form an optical circulator in which either the even mode and the odd mode are combined/split, or the upper hald light and the lower half light interfere with each other.

In this optical circulator of FIG. 5, a light incoming from the port-1 is outputted to the port-2 while a light incoming from the port-2 is outputted to the port-3, and a light incoming from the port-3 is outputted to the port-4 while a light incoming from the port-4 is outputted to the port-1. The operation principle is similar to that described above with reference to FIGS. 4A to 4D.

Referring now to FIG. 6 to FIG. 14, several embodiments of the optical nonreciprocal circuit according to the present invention will be described in detail.

Figure 6:
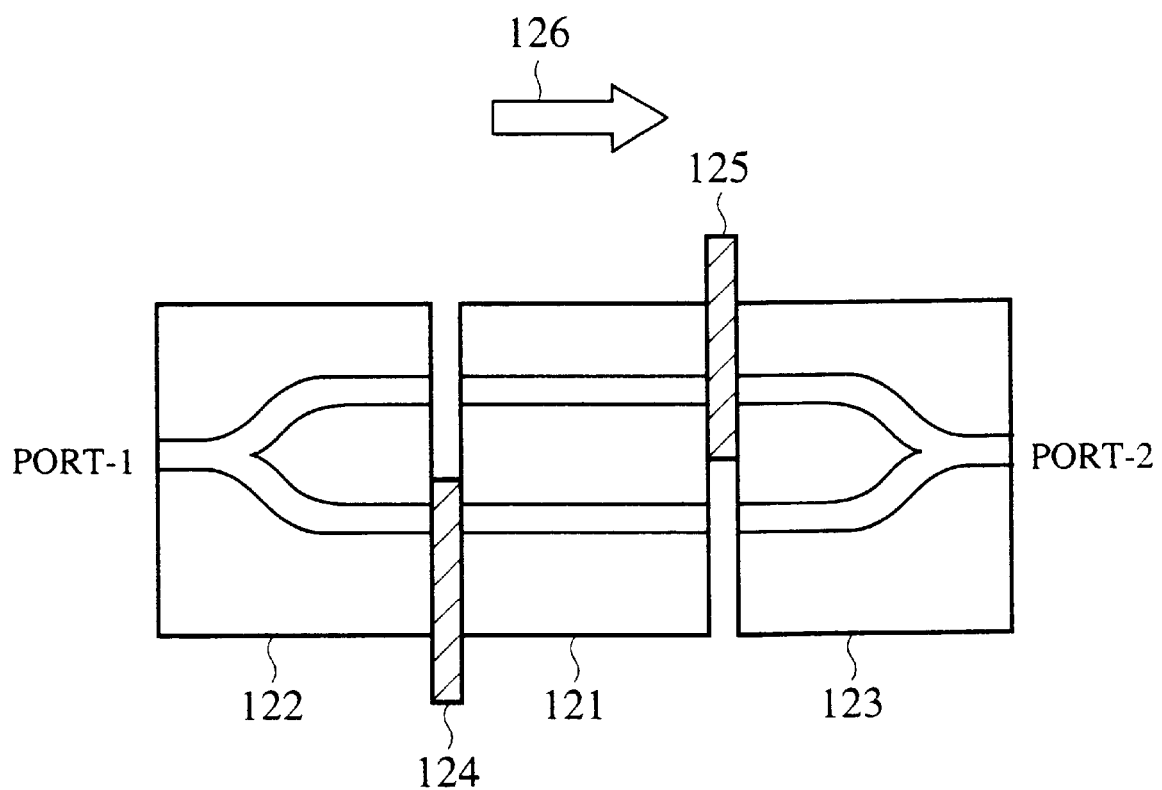
FIG. 6 is a block diagram of the first embodiment of an optical nonreciprocal circuit according to the present invention.

FIG. 6 shows the first embodiment of the optical nonreciprocal circuit according to the present invention, which is based on the first basic configuration of FIG. 3.

This optical nonreciprocal circuit of FIG. 6 comprises a magneto-optic waveguide 121 with two waveguide paths, Y-branching waveguides 122 and 123 provided on both sides of the magneto-optic waveguide 121, and half wave plates 124 and 125 inserted between the magneto-optic waveguide 121 and the Y-branching waveguides 122 and 123 respectively, on respective waveguide paths of the magneto-optic waveguide 121, where a magnetic field 126 is applied onto the magneto-optic waveguide 121.

The magneto-optic waveguide 121 is made of the magneto-optic material YIG (Yttrium Iron Garnet) which is manufactured to form two waveguide paths. By applying the magnetic field 126, this magneto-optic waveguide 121 exhibits the nonreciprocal Faraday effect. The material of the magneto-optic waveguide 121 can be the substituted YIG. As for the material of the Y-branching waveguides 122 and 123, garnet, quartz, glass, etc. can be used.

Figure 7:
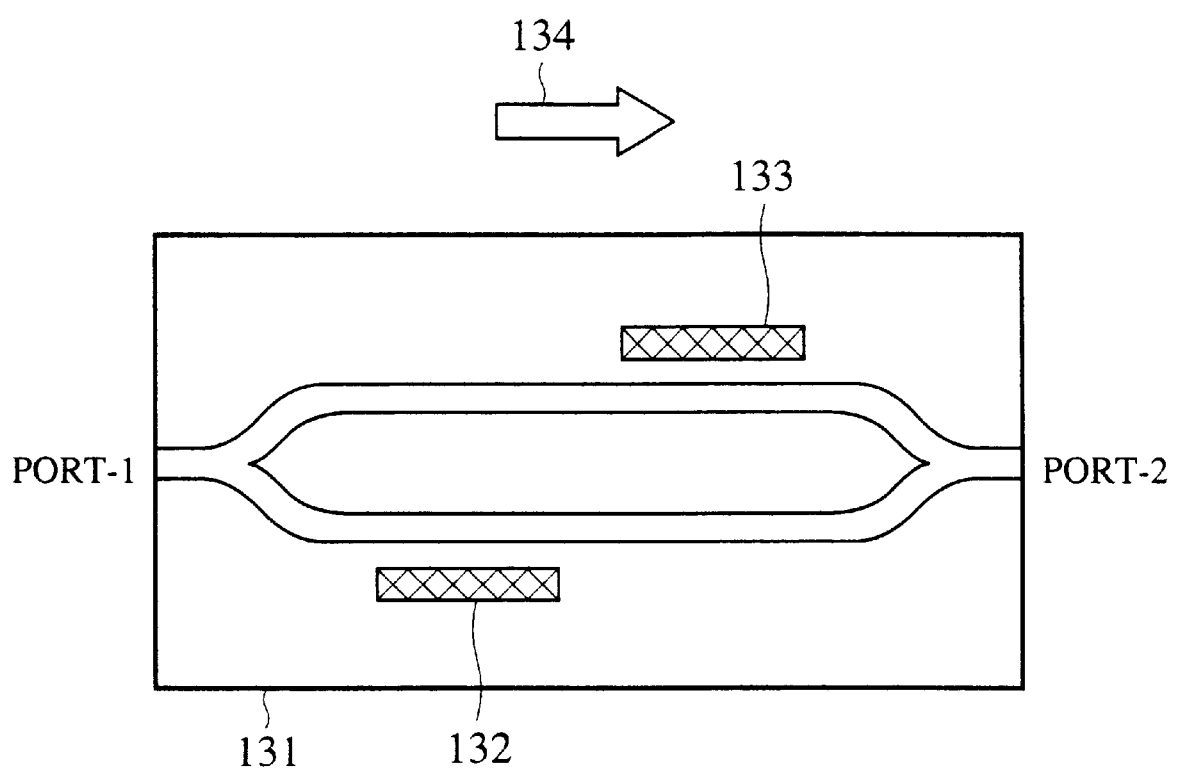
FIG. 7 is a block diagram of the second embodiment of an optical nonreciprocal circuit according to the present invention.

FIG. 7 shows the second embodiment of the optical nonreciprocal circuit according to the present invention, which is based on the first basic configuration of FIG. 3.

This optical nonreciprocal circuit of FIG. 7 comprises an interferometer type magneto-optic waveguide 131 in which two waveguide paths functioning as the nonreciprocal rotators and Y-branching waveguides are integrally formed by the magneto-optic waveguide, and stress applying films 132 and 133 which are provided in the interferometer type magneto-optic waveguide 131 nearby the respective waveguide paths, where a magnetic field 134 is applied onto the interferometer type magneto-optic waveguide 131.

The stress applying films 132 and 133 made of a-Si cause strain on the respective waveguide paths, so as to realize functions of the half wave plates.

In this second embodiment, the interferometer type magneto-optic waveguide 131 incorporating the stress applying films 132 and 133 can be manufactured integrally, so that it is suitable for the optical integrated implementation.

Figure 8:
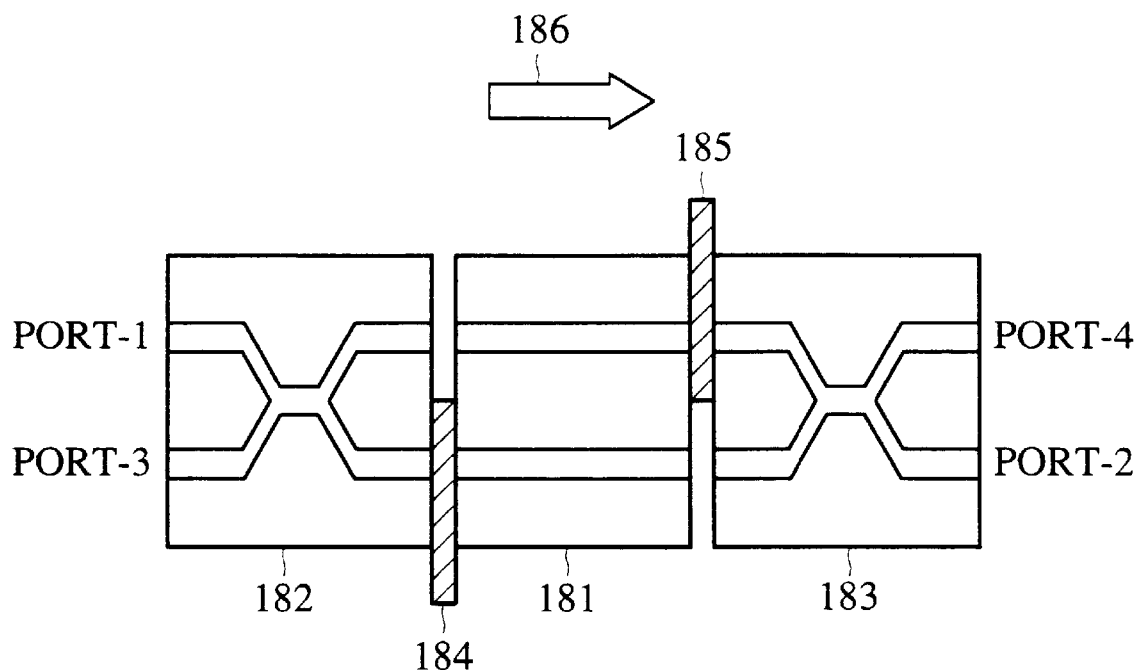
FIG. 8 is a block diagram of the third embodiment of an optical nonreciprocal circuit according to the present invention.

FIG. 8 shows the third embodiment of the optical nonreciprocal circuit according to the present invention, which is based on the second basic configuration of FIG. 5.

This optical nonreciprocal circuit of FIG. 8 comprises a magneto-optic waveguide 181 with two waveguide paths, X-branching waveguides 182 and 183 provided on both sides of the magneto-optic waveguide 181, and half wave plates 184 and 185 inserted between the magneto-optic waveguide 181 and the X-branching waveguides 182 and 183 respectively, on respective waveguide paths of the magneto-optic waveguide 181, where a magnetic field 186 is applied onto the magneto-optic waveguide 181.

The magneto-optic waveguide 181 is similar to the magneto-optic waveguide 121 of the first embodiment described above. The X-branching waveguides 182 and 183 combine/split the even mode and the odd mode.

Figure 9:
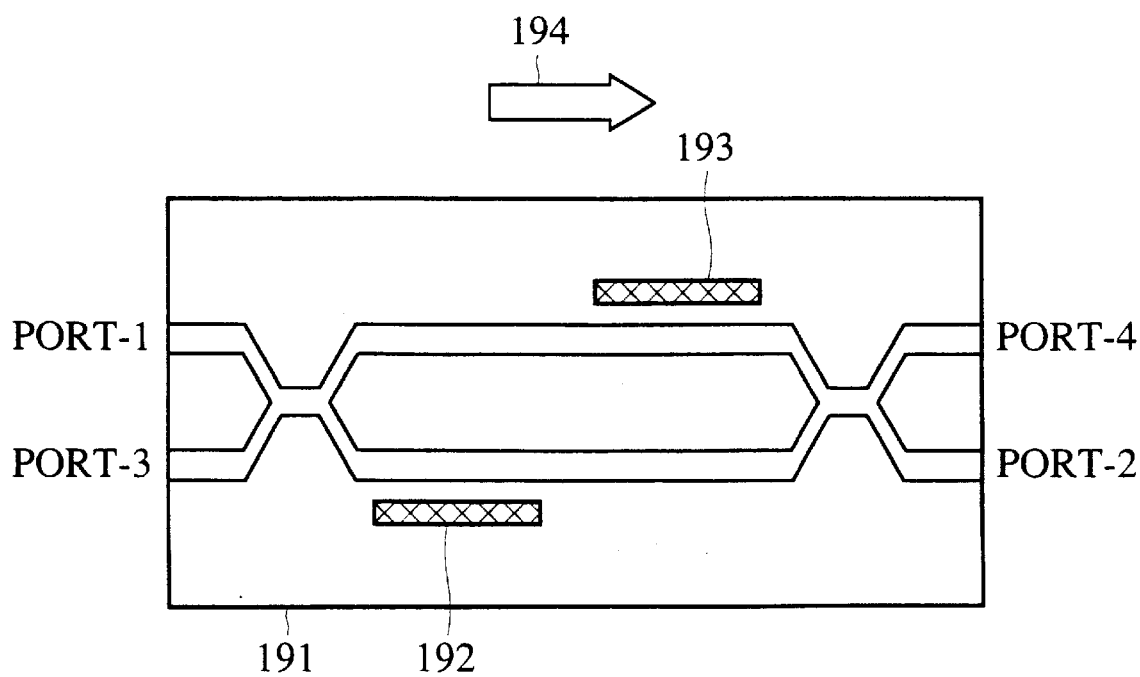
FIG. 9 is a block diagram of the fourth embodiment of an optical nonreciprocal circuit according to the present invention.

FIG. 9 shows the fourth embodiment of the optical nonreciprocal circuit according to the present invention, which is based on the second basic configuration of FIG. 5.

This optical nonreciprocal circuit of FIG. 9 comprises an interferometer type magneto-optic waveguide 191 in which two waveguide paths functioning as the nonreciprocal rotators and X-brancing waveguides are integrally formed by the magneto-optic waveguide, and stress applying films 192 and 193 which are provided in the interferometer type magneto-optic waveguide 191 nearby the respective waveguide paths, where a magnetic field 194 is applied onto the interferometer type magneto-optic waveguide 191.

The stress applying films 192 and 193 are similar to the stress applying films 132 and 133 of the second embodiment described above.

In this fourth embodiment, the interferometer type magneto-optic waveguide 191 incorporating the stress applying films 192 and 193 can be manufactured integrally, so that it is suitable for the optical integrated implementation.

Figure 10:
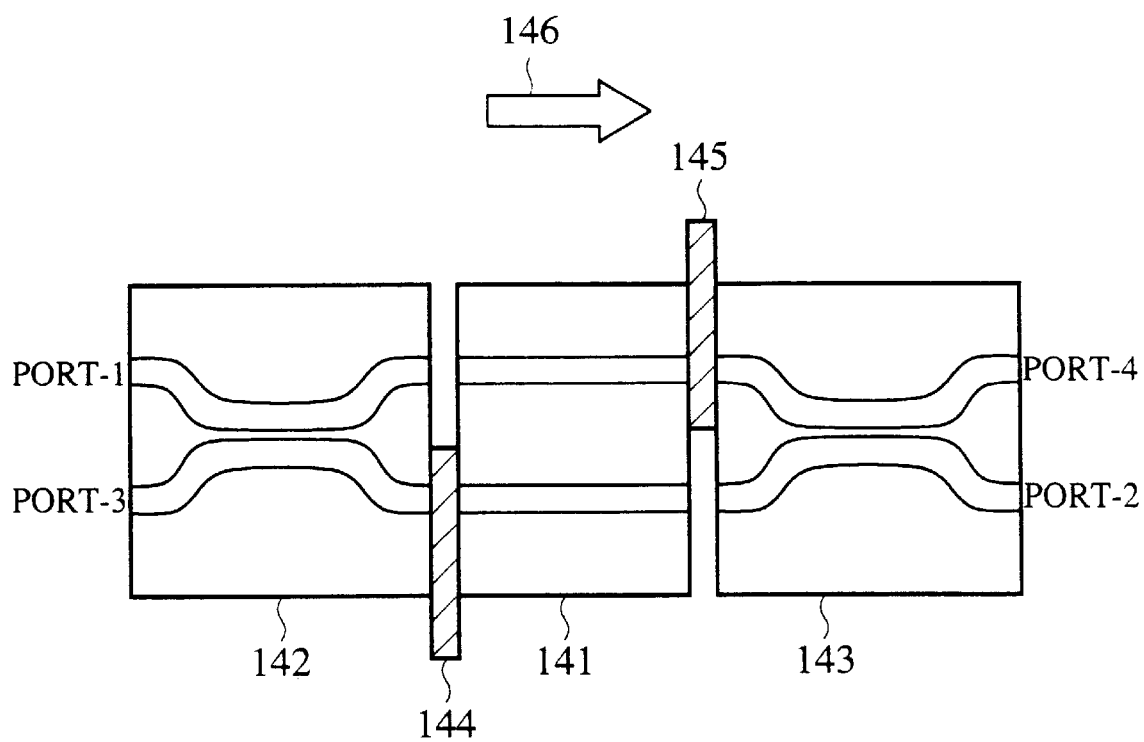
FIG. 10 is a block diagram of the fifth embodiment of an optical nonreciprocal circuit according to the present invention.

FIG. 10 shows the fifth embodiment of the optical nonreciprocal circuit according to the present invention, which is based on the second basic configuration of FIG. 5.

This optical nonreciprocal circuit of FIG. 10 comprises a magneto-optic waveguide 141 with two waveguide paths, four terminal branching waveguides 142 and 143 provided on both sides of the magneto-optic waveguide 141, and half wave plates 144 and 145 inserted between the magneto-optic waveguide 141 and the four terminal branching waveguides 142 and 143 respectively, on respective waveguide paths of the magneto-optic waveguide 141, where a magnetic field 146 is applied onto the magneto-optic waveguide 121.

The magneto-optic waveguide 141 is similar to the magneto-optic waveguide 121 of the first embodiment described above. The four terminal branching waveguides 142 and 143 are formed by directional coupler waveguides which make the upper half light and the lower half light to interfere with each other.

Figure 11:
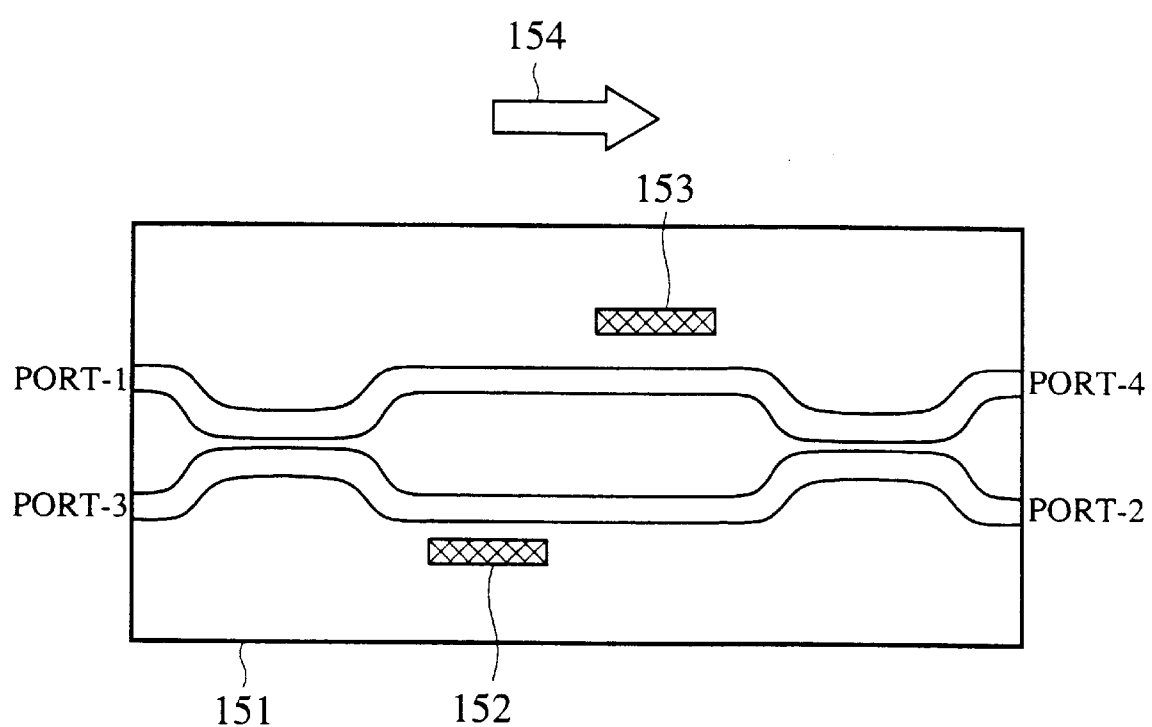
FIG. 11 is a block diagram of the sixth embodiment of an optical nonreciprocal circuit according to the present invention.

FIG. 11 shows the sixth embodiment of the optical nonreciprocal circuit according to the present invention, which is based on the second basic configuration of FIG. 5.

This optical nonreciprocal circuit of FIG. 11 comprises an interferometer type magneto-optic waveguide 151 in which two waveguide paths functioning as the nonreciprocal rotators and directional couplers are integrally formed by the magneto-optic waveguide, and stress applying films 152 and 153 which are provided in the interferometer type magneto-optic waveguide 151 nearby the respective waveguide paths, where a magnetic field 154 is applied onto the interferometer type magneto-optic waveguide 151.

The stress applying films 152 and 153 are similar to the stress applying films 132 and 133 of the second embodiment described above.

In this sixth embodiment, the interferometer type magneto-optic waveguide 151 incorporating the stress applying films 152 and 153 can be manufactured integrally, so that it is suitable for the optical integrated implementation.

Figure 12:
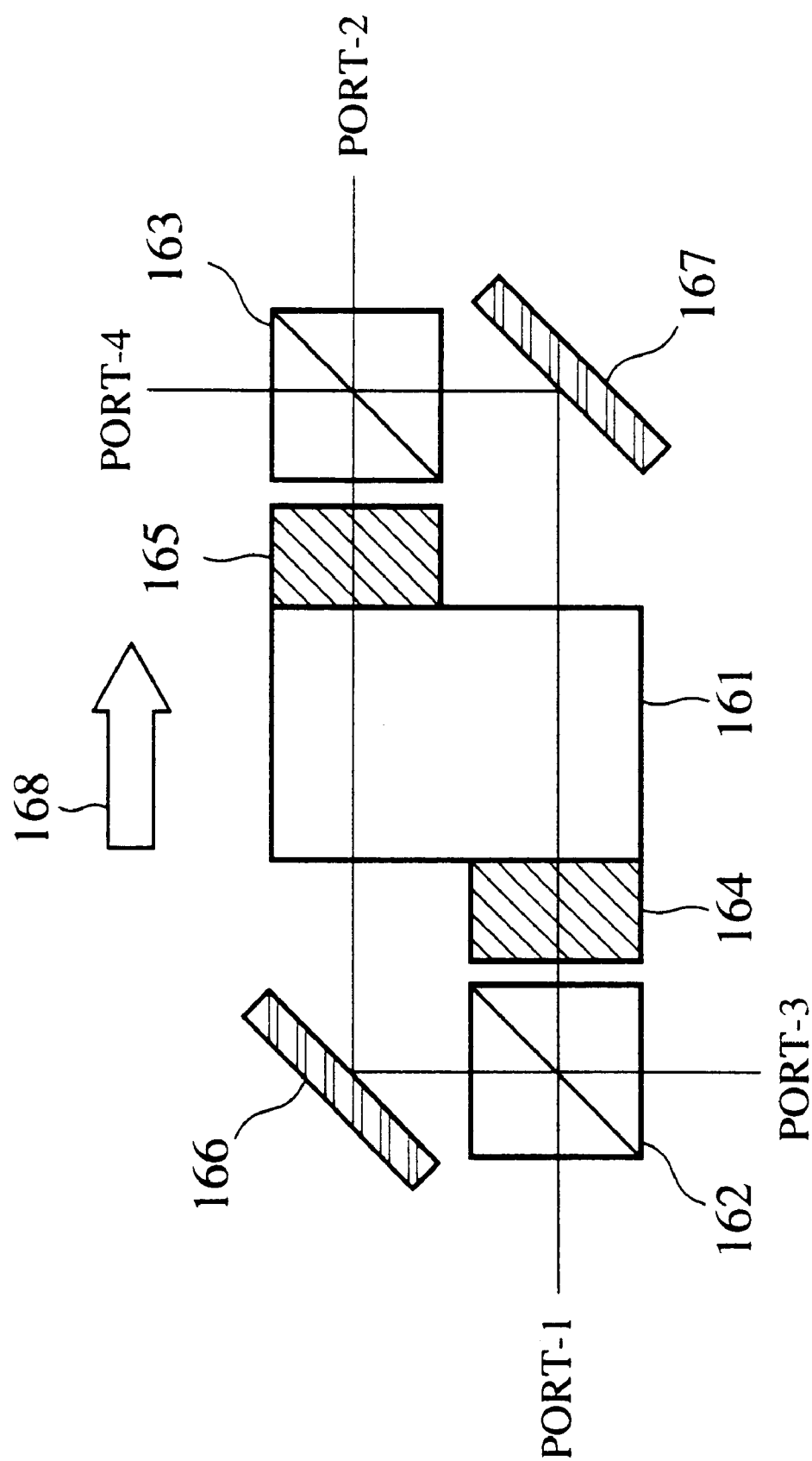
FIG. 12 is a block diagram of the seventh embodiment of an optical nonreciprocal circuit according to the present invention.

FIG. 12 shows the seventh embodiment of the optical nonreciprocal circuit according to the present invention, which is based on the second basic configuration of FIG. 5.

This optical nonreciprocal circuit of FIG. 12 comprises a magneto-optic crystal 161, half wave plates 164 and 165 provided on a lower half of the left side and an upper half of the right side of the magneto-optic crystal 161 respectively, beam splitters 162 and 163 provided next to the half wave plates 164 and 165 respectively, and mirrors 166 and 167 provided next to an upper half of the left side and a lower half of the right side of the magneto-optic crystal 161, where a magnetic field 168 is applied onto the magneto-optic crystal 161.

This seventh embodiment has a structure in which light beams propagate through the space, rather than the waveguide structure of the previous embodiments.

Figure 13:
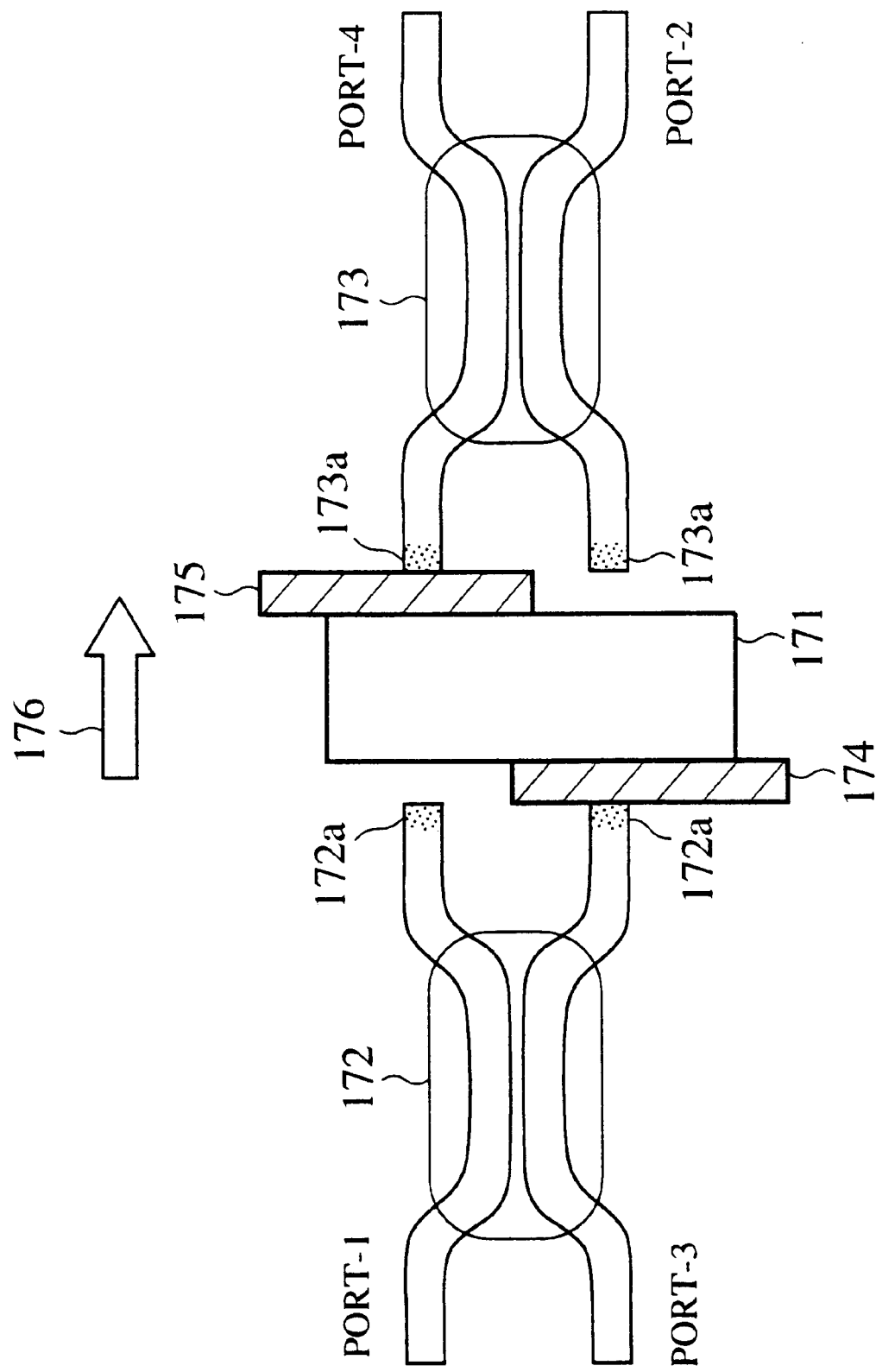
FIG. 13 is a block diagram of the eighth embodiment of an optical nonreciprocal circuit according to the present invention.

FIG. 13 shows the eighth embodiment of the optical nonreciprocal circuit according to the present invention, which is based on the second basic configuration of FIG. 5.

This optical nonreciprocal circuit of FIG. 13 comprises a magneto-optic crystal 171, optical fiber couplers 172 and 173 provided on both sides of the magneto-optic crystal 171, and half wave plates 174 and 175 inserted between the magneto-optic crystal 171 and the optical fiber couplers 172 and 173 respectively and provided on a lower half of the left side and an upper half of the right side of the magneto-optic crystal 171 respectively, where a magnetic field 176 is applied onto the magneto-optic crystal 171.

In this eighth embodiment, the branching circuits and the optical paths of FIG. 5 are formed by the known optical fiber couplers 172 and 173, each of which is formed by fusion connecting two optical fibers. Tip edges 172a and 173a of the optical fibers facing toward the magneto-optic crystal 171 has enlarged cores, so that the spread of the outgoing light beams can be suppressed. Because of the use of the optical fibers, the optical nonreciprocal circuit of FIG. 13 is easier to manufacture. For the optical fibers, the usual optical fibers can be used, but it is also possible to use the polarization maintaining fibers.

Figure 14:
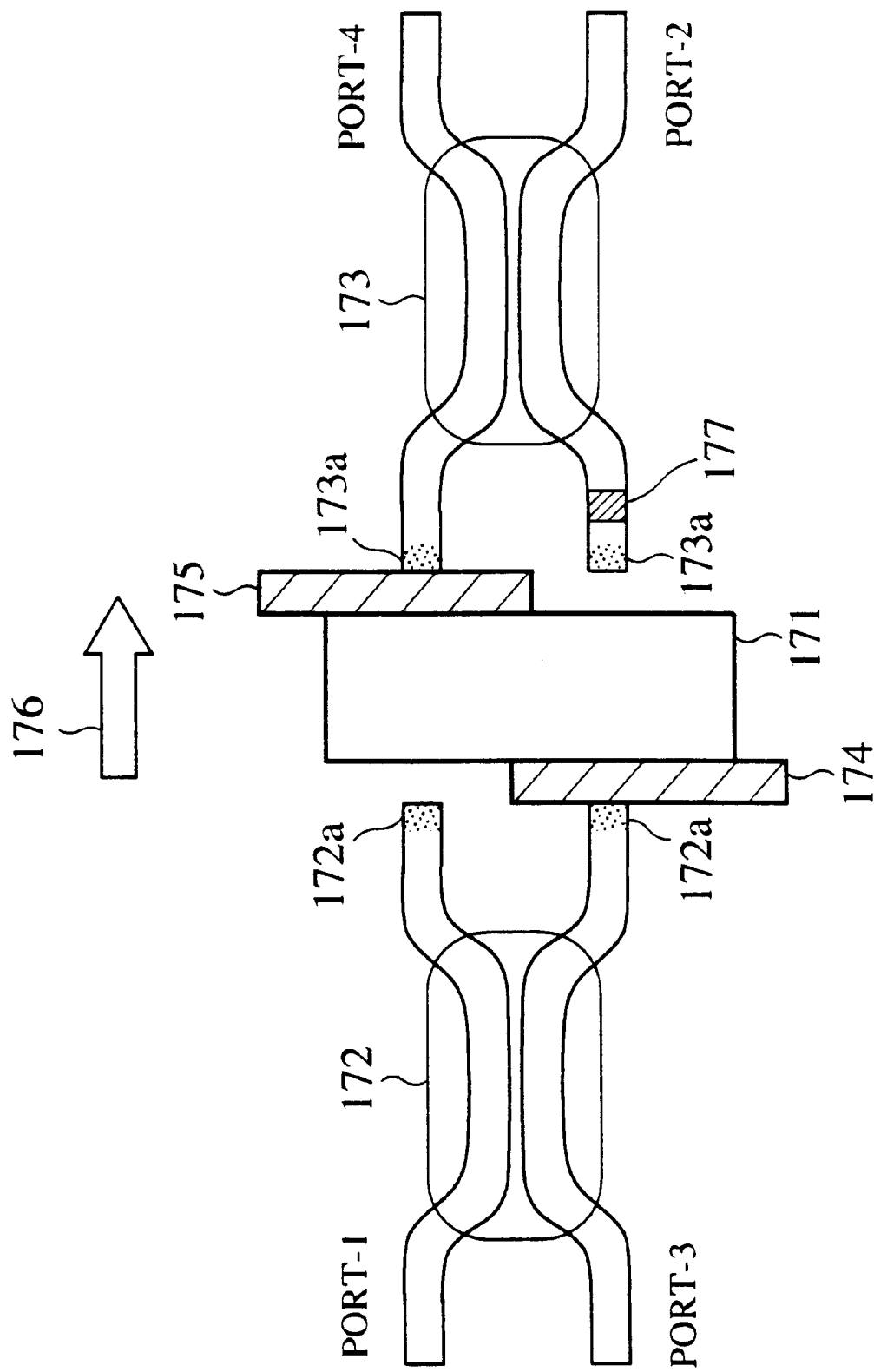
FIG. 14 is a block diagram of the ninth embodiment of an optical nonreciprocal circuit according to the present invention.

FIG. 14 shows the ninth embodiment of the optical nonreciprocal circuit according to the present invention, which is based on the second basic configuration of FIG. 5.

In this optical nonreciprocal circuit of FIG. 14, a phase adjustment unit 177 is additionally provided in at least one of the optical fibers constituting the optical fiber couplers 172 and 173 in the configuration of FIG. 13. The phase adjustment unit 177 makes the adjustment of the phase by means of the change of the refractive index caused by applying ultraviolet ray or heat to a part of the optical fiber, for example. The rest of this configuration of FIG. 14 and its operation in this ninth embodiment is the same as the eighth embodiment described above.

Note that the phase adjustment unit of this ninth embodiment can be used in conjunction with any of the first to eighth embodiments described above.

Now, the optical nonreciprocal circuit of any of the first to ninth embodiments described above requires a use of optical branching circuits and utilizes the interferences, so that some phase adjustment is indispensable in practice.

Referring now to FIG. 15 to FIG. 20, further embodiments of the optical nonreciprocal circuit according to the present invention which are directed to an inexpensive optical nonreciprocal circuit, which does not require a use of expensive birefringent crystals, optical branching circuits, and a phase adjustment, will be described in detail.

Figure 15:
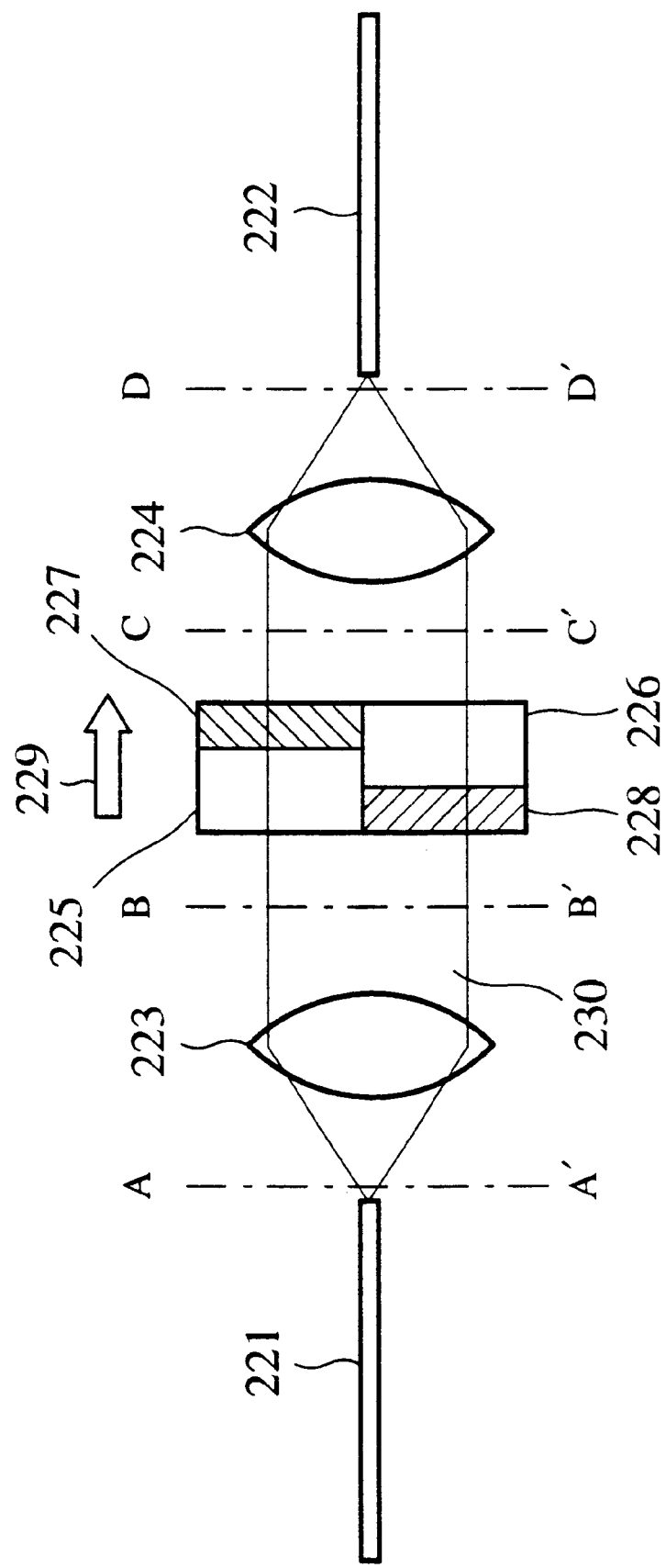
FIG. 15 is a block diagram of the tenth embodiment of an optical nonreciprocal circuit according to the present invention.

FIG. 15 shows the tenth embodiment of the optical nonreciprocal circuit according to the present invention.

This optical nonreciprocal circuit of FIG. 15 comprises single mode optical fibers 221 and 222, lenses 223 and 224 provided between the single mode optical fibers 221 and 222, a Faraday rotator 225 provided on an upper half of a space between the lenses 223 and 224, a Faraday rotator 226 provided on a lower hald of a space between the leses 223 and 224, a half wave plate 227 provided on the lense 224 side of the Faraday rotator 225, and a half wave plate 228 provided on the lense 223 side of the Faraday rotator 226, where a magnetic field 229 is applied onto the Faraday rotators 225 and 226.

In this configuration of FIG. 15, a light incoming from the single mode fiber 221 is turned into a parallel beam 230 by the lens 223, and an upper half of the parallel beam 230 passes through the Faraday rotator 225 and the half wave plate 227 while a lower half of the parallel beam 230 passes through the half wave plate 228 and the Faraday rotator 226. The upper and lower halves of the parallel beam 230 are then collimated by the lens 224 and coupled into the single mode optical fiber 222.

On the other hand, a light incoming from the single mode optical fiber 222 is turned into a parallel beam 230 by the lens 224, and an upper half of the parallel beam 230 passes through the half wave plate 227 and the Faraday rotator 225 while a lower half of the parallel beam 230 passes through the Faraday rotator 226 and the half wave plate 228. The upper half and the lower half of the parallel beam 230 are then collimated by the lens 223 and coupled into the single mode optical fiber 221.

Here, a direction of a light propagaing toward the right direction will be taken as a z-axis, x-axis and y-axis are suitably set within a plane perpendicular to the z-axis, and a clockwise rotation will be taken as a positive rotation. With respect to this coordinates setting, the Faraday rotation angles of the Faraday rotators 225 and 226 will be denoted as $\theta_{f1}$ and $\theta_{f2}$, respectively, while the slow axis angle of the half wave plates 227 and 228 with respect to the x-axis will be denoted as $\theta_{s1}$ and $\theta_{s2}$, respectively.

In this tenth embodiment, $\theta_{f1}$, $\theta_{f2}$, $\theta_{s1}$ and $\theta_{s2}$ are set to satisfy the following general conditions given by the above described equations (4) and (5), which are as follows:

$$\theta_{s1}-\theta_{s2}=\pm\pi/4 \qquad (4)$$

$$\theta_{f1}+\theta_{f2}=\pm\pi/2+2n\pi \text{(where n is an integer)} \qquad (5)$$

Figure 16A:
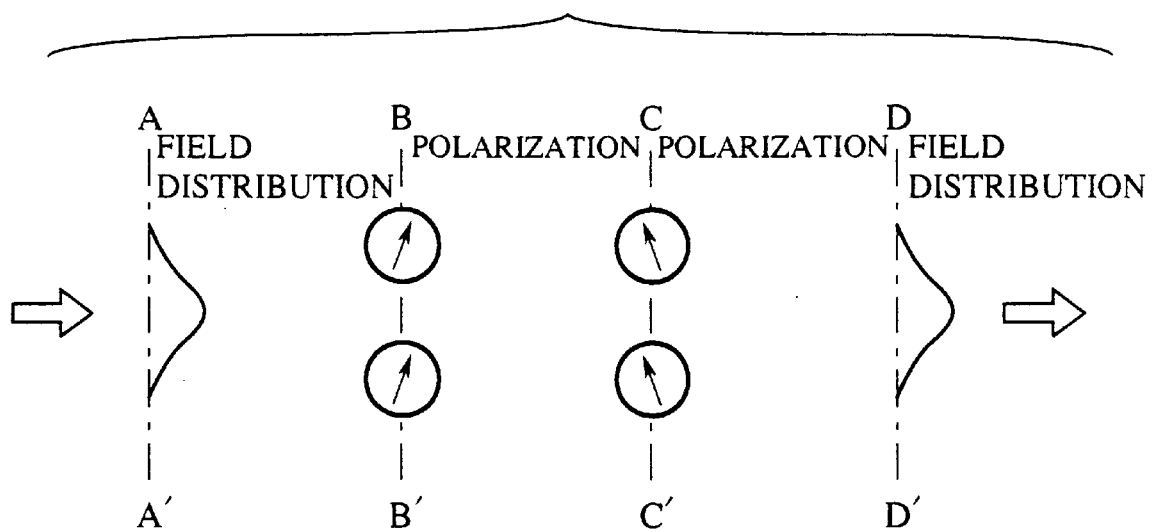
FIGS. 16A and 16B are diagrams for explaining the operation principle of the optical nonreciprocal circuit of FIG. 15.
Figure 16B:
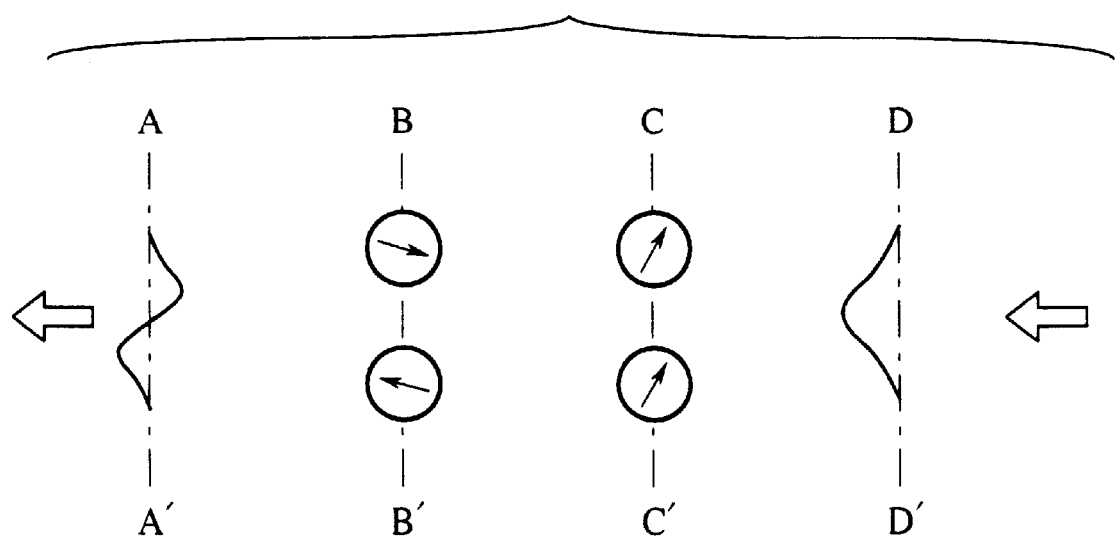

FIG. 16A and FIG. 16B show electric field distributions at A–A' plane and D–D' plane located at the tip ends of the single mode optical fibers 221 and 222 as indicated in FIG. 15, and polarization states of the parallel beam 230 at B–B' plane and C–C' plane as indicated in FIG. 15, for a light incoming from the single mode optical fiber 221 and a light incoming from the single mode optical fiber 222, respectively.

As shown in FIG. 16A, the electric field distribution of a light incoming from the single mode optical fiber 221 is symmetric in the even guided mode at A–A' plane, and after passing through the lens 223, the upper half and the lower half of the parallel beam 230 have the same polarization at B–B' plane.

Then, after the upper half of the parallel beam 230 passes through the Faraday rotator 225 and the half wave plate 227 and the lower half of the parallel beam 230 passes through the half wave plate 228 and the Faraday rotator 226, the upper half and the lower half of the parallel beam 230 still have the same polarization at C–C' plane.

Consequently, the electric field distribution of the light collimated by the lens 224 is also symmetric in the even guided mode at D–D' plane, so that the upper half and the lower half of the light are coupled into the single mode optical fiber 222.

On the other hand, as shown in FIG. 16B, the electric field distribution of a light incoming from the single mode optical fiber 222 is symmetric in the even guided mode at D–D' plane, and after passing through the lens 224, the upper half and the lower half of the parallel beam 230 have the same polarization at C–C' plane.

Then, after the upper half of the parallel beam 230 passes through the half wave plate 227 and the Faraday rotator 225 and the lower half of the parallel beam 230 passes through the Faraday rotator 226 and the half wave plate 228, the upper half and the lower half of the parallel beam 230 have the opposite polarizations at B–B' plane.

Consequently, the electric field distribution of the light collimated by the lens 223 is antisymmetric in the odd non-guided mode at A–A' plane, so that the upper half and the lower half of the light are not coupled into the single mode optical fiber 221 and dissipated.

In this manner, the polarization independent optical isolator is realized by the configuration of FIG. 15 according to this tenth embodiment.

Figure 17:
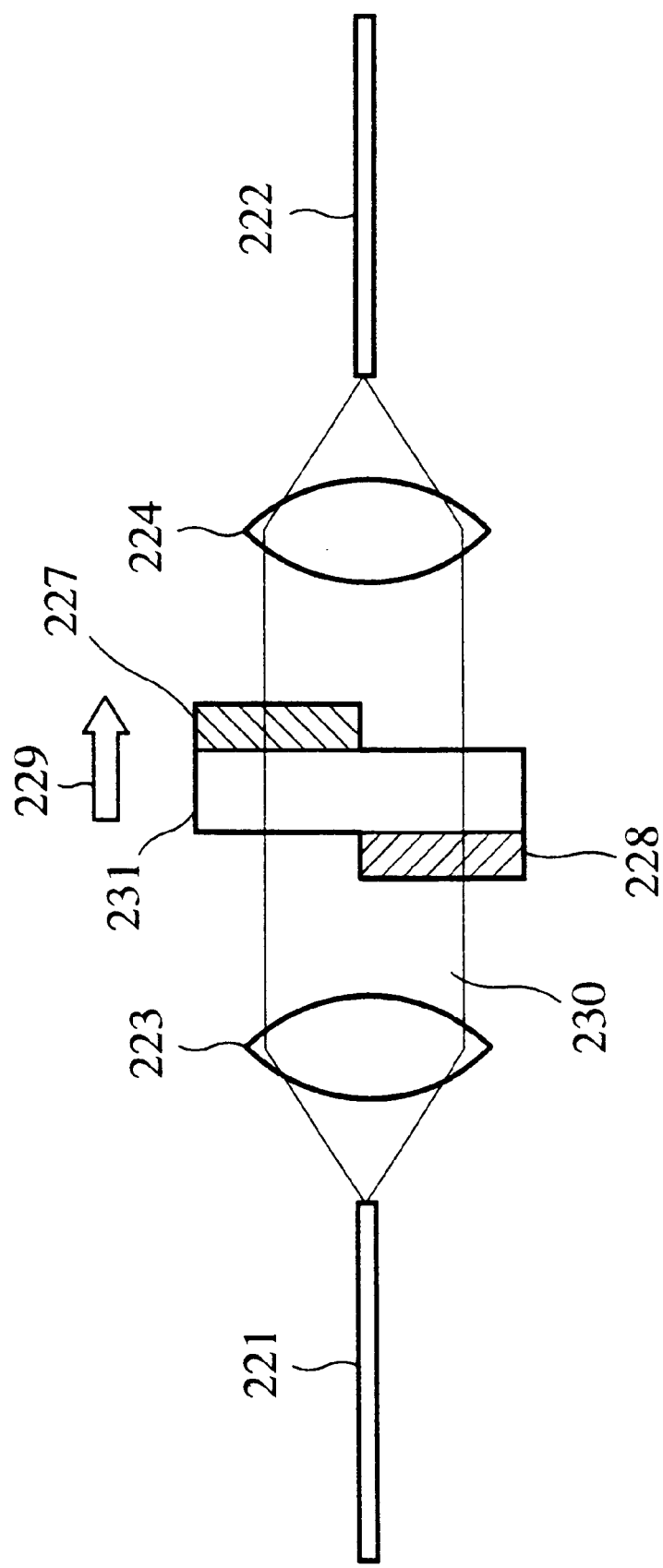
FIG. 17 is a block diagram of the eleventh embodiment of an optical nonreciprocal circuit according to the present invention.

FIG. 17 shows the eleventh embodiment of the optical nonreciprocal circuit according to the present invention.

In this optical nonreciprocal circuit of FIG. 17, a single Faraday rotator 231 replaces two Faraday rotators 225 and 226 in the configuration of FIG. 15. The rest of this configuration of FIG. 17 and its operation in this eleventh embodiment are the same as the tenth embodiment described above.

Figure 18:
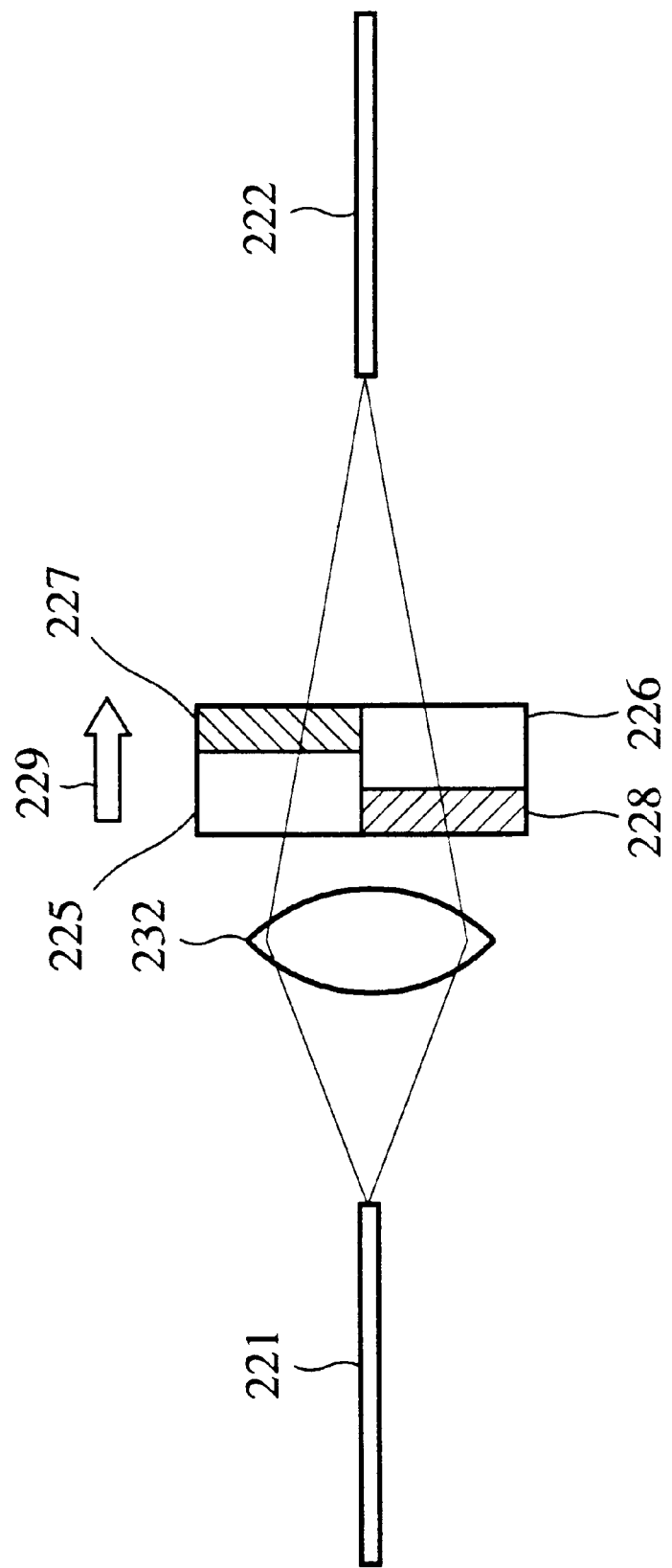
FIG. 18 is a block diagram of the twelfth embodiment of an optical nonreciprocal circuit according to the present invention.

FIG. 18 shows the twelfth embodiment of the optical nonreciprocal circuit according to the present invention.

In this optical nonreciprocal circuit of FIG. 18, a single lens 232 replaces two lenses 223 and 224 in the configuration of FIG. 15. The rest of this configuration of FIG. 18 and its operation in this twelfth embodiment are the same as the tenth embodiment described above.

Figure 19:
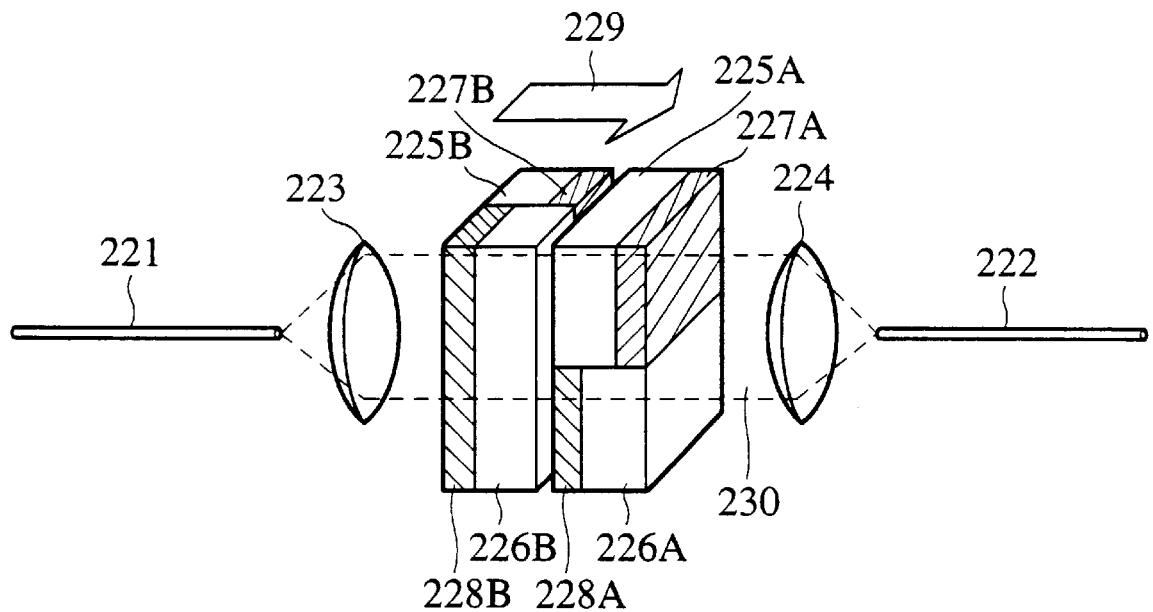
FIG. 19 is a block diagram of the thirteenth embodiment of an optical nonreciprocal circuit according to the present invention.

FIG. 19 shows the thirteenth embodiment of the optical nonreciprocal circuit according to the present invention.

In this optical nonreciprocal circuit of FIG. 19, the functions of a pair of the Faraday rotator 225 and the half wave plate 227 and a pair of the Faraday rotator 226 and the half wave plate 228 in the configuration of FIG. 15 are provided in two stages, by a pair of a Faraday rotator 225A and a half wave plate 227A and a pair of a Faraday rotator 226A and a half wave plate 228A on the first stage, and a pair of a Faraday rotator 225B and a half wave plate 227B and a pair of a Faraday 226B and a half wave plate 228B on the second stage.

Here, a direction in which the Faraday rotator-half wave plate pairs on the first stage are arranged is set perpendicular to a direction in which the Faraday rotator-half wave plate pairs on the second state are arranged, so that the Faraday rotator-half wave plate pairs on the first stage divide the light into an upper half and a lower half (along x-axis) while the Faraday rotator-half wave plate pairs on the second stage divide the light into a left half and a right half (along y-axis).

With this configuration of FIG. 19, the backward light which was not completely turned into the odd non-guided mode at the first stage can be completely turned into the odd non-guided mode at the second stage, so as to improve the isolation of the light. Since the first stage and the second stage are arranged perpendicular to each other, the backward light which was turned into the odd non-guided mode at the first stage would not be turned into the even guided mode at the second stage.

The rest of this configuration of FIG. 19 and its operation in this thirteenth embodiment are the same as the tenth embodiment described above.

Figure 20:
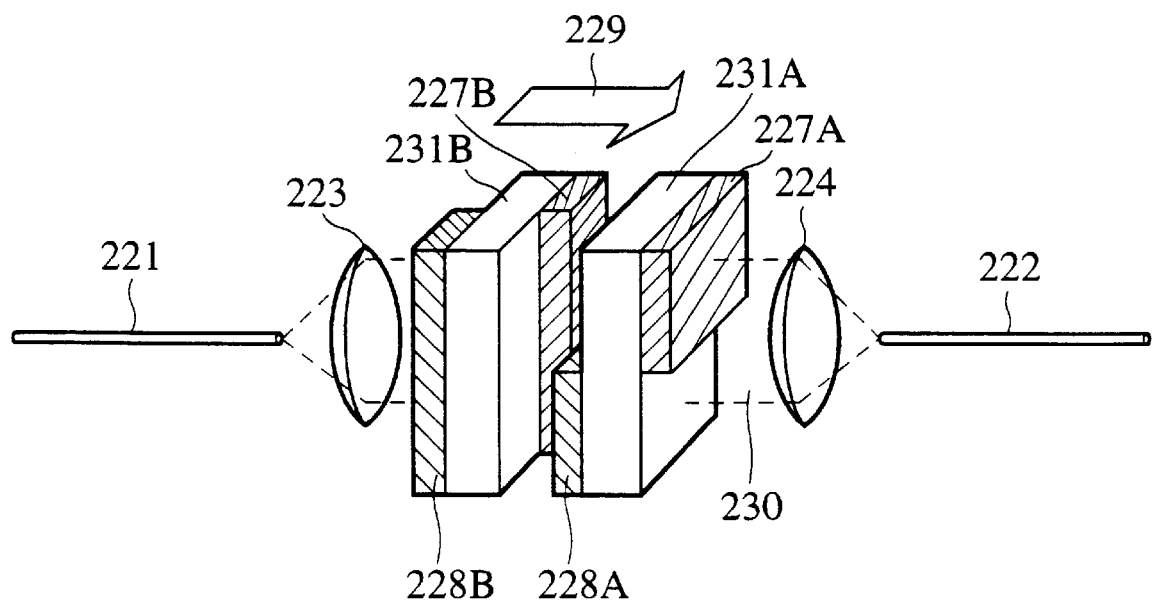
FIG. 20 is a block diagram of the fourteenth embodiment of an optical nonreciprocal circuit according to the present invention.

FIG. 20 shows the fourteenth embodiment of the optical nonreciprocal circuit according to the present invention.

In this optical nonreciprocal circuit of FIG. 20, a single Faraday rotator 231A replaces two Faraday rotators 225A and 226A of the first stage in the configuration of FIG. 15, and a single Faraday rotator 231B replaces two Faraday rotators 225B and 226B of the second stage in the configuration of FIG. 15. The rest of this configuration of FIG. 20 and its operation in this fourteenth embodiment are the same as the tenth embodiment described above.

As described, according to the optical nonreciprocal circuit of the first to ninth embodiments described above, by sequentially applying the nonreciprocal rotation and the reciprocal rotation to a split part of the light while sequentially applying the reciprocal-rotation and the nonreciprocal rotation to another split part of the light, the split parts of the light propagating forward are combined with the identical polarization so that the light is outputted while maintaining its original power, whereas the split parts of the light propagating backward are combined with the opposite polarizations so that the light is not outputted as its power is dissipated. Consequently, it is possible to realize an inexpensive optical nonreciprocal circuit which is suitable for the integrated implementation, without requiring a use of polarization beam splitters which are expensive and not suitable for the integrated implementation.

Also, according to the optical nonreciprocal circuit of the tenth to fourteenth embodiments described above, at a time of coupling the light between two optical waveguides using a lens, by sequentially applying the nonreciprocal rotation and the reciprocal rotation to a half of the light while sequentially applying the reciprocal rotation and the nonreciprocal rotation to another half of the light, the halves of the light propagating forward are combined with the identical polarization into the even guided mode and coupled so that the light is outputted while maintaining its original power, whereas the halves of the light propagating backward are combined with the opposite polarizations into the odd non-guided mode and not coupled so that the light is not outputted as its power is dissipated. Consequently, it is possible to realize an inexpensive optical nonreciprocal circuit which does not require a use of expensive birefringent crystals, optical branching circuits and a phase adjustment.

Moreover, according to the present invention, it is possible to realize a polarization independent optical nonreciprocal circuit which is capable of providing a large degree of freedom in its configuration and of eliminating the polarization dependent loss due to the branching circuits such as directional couplers, even in a configuration which does not require a use of polarization beam splitters.

It is to be noted that, in each of the first to fourteenth embodiments described above, it is also possible to use an electromagnet for the purpose of applying the magnetic field. In such a case, as is well known in the art, it is possible to make the optical nonreciprocal circuit functions as an optical switch or an optical variable attenuator by changing a direction and an amount of currents supplied to the electromagnet. The optical nonreciprocal circuit of any of the first to fourteenth embodiments described above may be modified to function as an optical switch or an optical variable attenuator by utilizing such an electromagnet.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical nonreciprocal circuit for splitting/combining lights, comprising:

a first optical path and a second optical path through which first and second split lights propagate;

a first polarization rotation circuit provided on the first optical path, including a first nonreciprocal rotator having a Faraday rotation angle $\theta_{f1}$, and a first reciprocal rotator formed by a half wave plate having a slow axis angle $\theta_{s1}$ with respect to an x-axis in x-y coordinates set up within a plane perpendicular to a propagation direction of the light, which are provided in relation to the first split light; and a second polarization rotation circuit provided on the second optical path, including a second reciprocal rotator formed by a half wave plate having a slow axis angle $\theta_{s2}$ with respect to the x-axis, and a second nonreciprocal rotator having a Faraday rotation angle $\theta_{f2}$, which are provided in relation to the second split light;

wherein $\theta_{f1}$, $\theta_{f2}$, $\theta_{s1}$, and $\theta_{s2}$ satisfy:

$$\theta_{s1}-\theta_{s2}=\pm\pi/4,$$

and $$\theta_{f1}+\theta_{f2}=\pm\pi/2+2n\pi,$$

where n is an integer, so that the first split light and the second split light for a light propagating forward are set to have an identical polarization and combined to form an even mode, while the first split light and the second split light for a light propagating backward are set to have opposite polarizations and combined to form an odd mode, and the first and second nonreciprocal rotators are provided by a magneto-optic waveguide constituting at least a part of the first and second optical paths to which a magnetic field is applied.

2. The optical nonreciprocal circuit of claim 1, further comprising:

a first split/combine circuit, provided on one end side of the first and second optical paths, for splitting a light propagating forward into the first and second split lights and outputting the first and second split lights to the first and second optical paths, and combining a light propagating backward entered from the first and second optical paths; and a second split/combine circuit, provided on another end side of the first and second optical paths, for splitting a light propagating backward into the first and second split lights and outputting the first and second split lights to the first and second optical paths, and combining a light propagating forward entered from the first and second optical paths.

3. The optical nonreciprocal circuit of claim 2, wherein each of the first and second split/combine circuits is a Y-branching circuit, so that the optical nonreciprocal circuit constitutes an optical isolator.

4. The optical nonreciprocal circuit of claim 2, wherein each of the first and second split/combine circuits is an X-branching circuit, so that the optical nonreciprocal circuit constitutes an optical circulator.

5. The optical nonreciprocal circuit of claim 2, wherein each of the first and second split/combine circuits is an optical fiber coupler.

6. The optical nonreciprocal circuit of claim 1, wherein the first and second reciprocal rotators are provided by stress applying films, provided in vicinities of the first and second optical paths, which cause strain on the first and second optical paths.

7. The optical nonreciprocal circuit of claim 6, further comprising:

a first split/combine circuit, provided on one end side of the first and second optical paths, for splitting a light propagating forward into the first and second split lights and outputting the first and second split lights to the first and second optical paths, and combining a light propagating backward entered from the first and second optical paths; and a second split/combine circuit, provided on another end side of the first and second optical paths, for splitting a light propagating backward into the first and second split lights and outputting the first and second split lights to the first and second optical paths, and combining a light propagating forward entered from the first and second optical paths;

wherein the magneto-optic waveguide, the stress applying films, and the first and second split/combine circuits are integrally formed as an interferometer type magneto-optic waveguide circuit.

8. The optical nonreciprocal circuit of claim 1, wherein the first and second nonreciprocal rotators are provided by a magneto-optic crystal constituting at least a part of the first and second optical paths, to which a magnetic field is applied.

9. The optical nonreciprocal circuit of claim 1, wherein at least one of the first and second optical paths includes a phase adjustment circuit for adjusting a phase of the light propagating through said at least one of the first and second optical paths.

10. The optical nonreciprocal circuit of claim 1, wherein $\theta_{f1}$, $\theta_{f2}$, $\theta_{s1}$, and $\theta_{s2}$ also satisfy:

$$2\theta_{s1}-\theta_{f1}-2\theta_{s2}-\theta_{f2}=\pi+2m\pi,$$

where m is an integer.

11. An optical nonreciprocal circuit for splitting/combining lights, comprising:

a first optical path and a second optical path through which first and second split lights propagate;

a first directional coupler, provided on one end side of the first and second optical paths, for splitting a light propagating forward into the first and second split lights and outputting the first and second split lights to the first and second optical paths, and combining a light propagating backward entered from the first and second optical paths;

a second directional coupler, provided on another end side of the first and second optical paths, for splitting a light propagating backward into the first and second split lights and outputting the first and second split lights to the first and second optical paths, and combining a light propagating forward entered from the first and second optical paths;

a first polarization rotation circuit provided on the first optical path, including a first nonreciprocal rotator having a Faraday rotation angle $\theta_{f1}$, and a first reciprocal rotator formed by a half wave plate having a slow axis angle $\theta_{s1}$ with respect to an x-axis in x-y coordinates set up within a plane perpendicular to a propagation direction of the light, which are provided in relation to the first split light; and a second polarization rotation circuit provided on the second optical path, including a second reciprocal rotator formed by a half wave plate having a slow axis angle $\theta_{s2}$ with respect to the x-axis, and a second nonreciprocal rotator having a Faraday rotation angle $\theta_{f2}$, which are provided in relation to the second split light;

wherein $\theta_{f1}$, $\theta_{f2}$, $\theta_{s1}$, and $\theta_{s2}$ satisfy:

$$\theta_{s1} - \theta_{s2} = \pm \pi/4,$$

and $$\theta_{f1} + \theta_{f2} = \pm \pi/2 + 2n\pi,$$

where n is an integer, but not satisfying $\theta_{s1} = 3\pi/8$, $\theta_{s2} = 5\pi/8$, and $\theta_{f1} = \theta_{f2} = \pi/4$ simultaneously, so that the first split light and the second split light for a light propagating forward are set to interfere at an identical polarization and combined, while the first split light and the second split light for a light propagating backward are set to interfere at opposite polarizations and combined, and the first and second nonreciprocal rotators are provided by a magneto-optic waveguide constituting at least a part of the first and second optical paths to which a magnetic field is applied.

* * * * *